Feb. 20, 1968  F. T. IRGENS  3,369,528
ROTARY ENGINE SEAL
Filed March 26, 1965
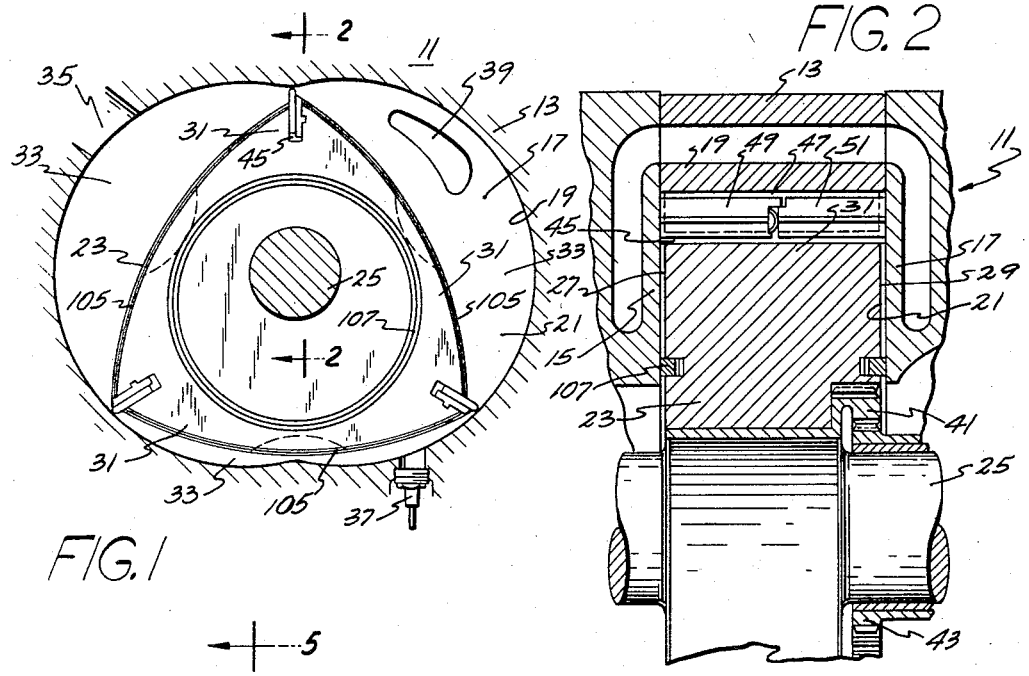
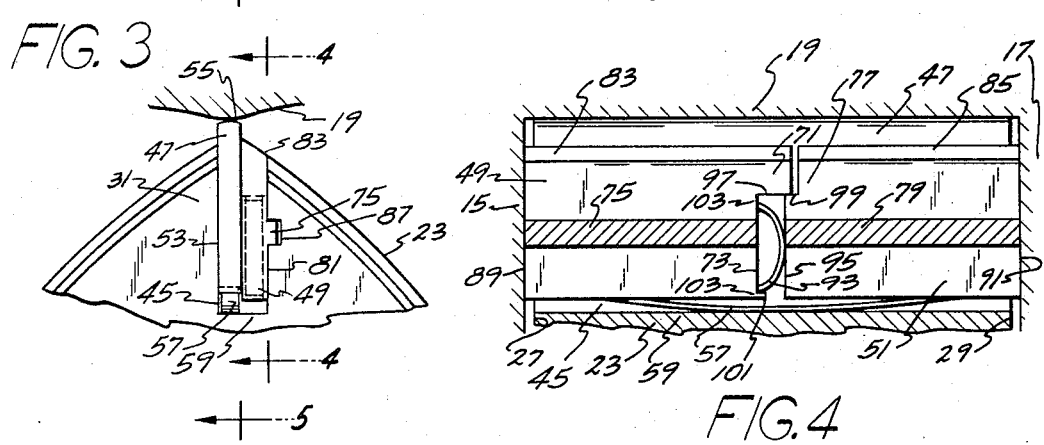
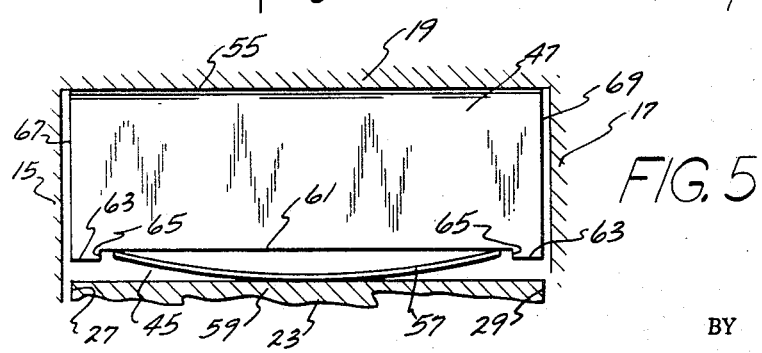
INVENTOR.
FINN T. IRGENS
BY
Wheeler, Wheeler & Wheeler
ATTORNEYS United States Patent Office 3,369,528
Patented Feb. 20, 1968

3,369,528
ROTARY ENGINE SEAL
Finn T. Irgens, Milwaukee, Wis., assignor to Outboard Marine Corporation, Waukegan, Ill., a corporation of Delaware
Filed Mar. 26, 1965, Ser. No. 443,012
4 Claims. (Cl. 123—8)

The invention relates generally to rotary internal combustion engines. More particularly, the invention relates to sealing arrangements for such engines.

Rotary internal combustion engines of the type referred to above generally include a housing comprising spaced parallel end walls and a connecting peripheral wall which cooperate to define a void or cavity. Such engines also include a rotor which is rotatably mounted within said cavity about an axis parallel to and spaced from the axis of the cavity and which, when seen in a plane normal to the rotor axis, has a multi-lobed profile. Such rotors generally include axially spaced end faces disposed adjacent to the cavity defining end walls and a plurality of circumferentially spaced apex portions which, during the rotation of the rotor relative to the housing, travel adjacent to the peripheral wall to form a plurality of working chambers which are located between the rotor and the peripheral wall and which vary in volume as a result of relative rotation between the rotor and the housing.

The invention provides a sealing arrangement to assist in sealing the working chambers from one another, which arrangement includes a slot extending radially inwardly from the outermost part of the periphery of each apex portion and between said end faces, a plurality of sealing members located in said slot, and means biasing one of said sealing members towards said peripheral wall and a second and third of said sealing members in opposite directions toward said opposing end walls.

In the preferred embodiment, the second and third sealing members are located in generally coplanar relation to each other within the slot and a leaf spring is located in the slot and between the second and third sealing members to simultaneously effect biasing of said members toward the respective end walls.

Also in accordance with the invention, means are provided for guiding or limiting the movement of the first member in directions normal to the rotor axis and for guiding or limiting movement of the second and third members in directions parallel to the axis. In addition, the second and third sealing members also include cooperating surfaces defining a projecting and recessed portion, which surfaces coact to exclude the passage of gas therebetween notwithstanding relative movement of the second and third sealing members toward and away from each other.

The sealing arrangement provided by the invention comprises components which are economical to manufacture and assemble and which are adapted to provide reliable sealing action.

Other objects and advantages of the invention will become known by reference to the following description and the accompanying drawings in which:

FIGURE 1 is a schematic view, partially in section, of a rotary internal combustion engine;

FIGURE 2 is a sectional view taken generally along line 2—2 of FIGURE 1;

FIGURE 3 is an enlarged view of a portion of the engine shown in FIGURE 1;

FIGURE 4 is a sectional view taken along line 4—4 of FIGURE 3; and

FIGURE 5 is a sectional view taken along line 5—5 of FIGURE 3.

Shown in the drawings is a rotary internal combustion engine 11 comprising an outer body or housing 13 having axially spaced end walls 15 and 17 and a peripheral wall 19 which, together with the end walls 15 and 17, forms a cavity 21. As viewed in a plane transverse to the peripheral wall 19, the cavity 21 has a multi-lobed profile. While various arrangements can be employed, the specifically illustrated engine cavity is in the form of an epitrochord having two lobes.

Also included in the engine 11 is a rotor 23 located within the cavity 21 and eccentrically carried on a shaft 25 extending coaxially with the axis of the cavity 21. The rotor 23 includes axially spaced end faces 27 and 29 disposed adjacent to the respective end walls 15 and 17 of the housing 13, and a plurality of circumferentially spaced apex portions 31 which are one more in number than the number of lobes of the cavity 21 and which travel in adjacent relation to the peripheral wall 19, thereby forming a plurality of working chambers 33 between the rotor 21 and the housing 13. Thus, in the specifically illustrated construction, the rotor has three apex portions 31 and the rotor periphery is generally of triangular profile. In the specifically disclosed construction, employing an epitrochord shaped cavity 21 and a rotor 23 of triangular profile, three working chambers 33 are provided.

In addition to the foregoing, an exhaust port 35 is provided in the peripheral wall for discharging exhaust gas from the working chambers 33. Also included is a spark plug 37 for igniting the fuel-air mixture and an intake port 39 located in one or both end walls 15 and 17 for admitting air and fuel into the working chambers 33. During engine operation, the rotor 23 and housing 13 rotate relative to each other and each working chamber 33 is subject to an operational cycle including intake, compression, expansion, and exhaust phases which are similar in action to the intake, compression, expansion, and exhaust phases in a four-stroke cycle.

Various arrangements can be employed to afford relative rotation between the rotor 23 and the housing 13. For example, the housing and the rotor can be simultaneosuly rotated or either the rotor 23 or the housing 13 can be stationary while the other is rotatable. In the disclosed construction, the housing 13 is stationary and the rotor 23 is rotatable in the cavity 21. Specifically in this regard, an internal gear 41 is coaxially secured to the rotor 23 in meshing engagement with a fixed gear 43 secured to the housing 13 in coaxial relation with the shaft 25.

In order to obtain efficient engine operation, the working chambers 33 should be sealed from one another. Accordingly, each apex portion 31 is provided with means engageable with the peripheral wall 19 and end walls 15 and 17 of the cavity 21 to prevent flow between adjacent working chambers. In the disclosed construction, such means includes, in each apex portion 31, a slot 45 extending between the end faces 27 and 29 and radially inwardly from the outermost part of the periphery of the apex portion and a plurality of sealing members located, at least in part, in the slot 45. In the specifically disclosed construction, there is provided three such sealing members 47, 49, and 51 which are generally in the form of rectangular prisms. In addition, such means includes means biasing the first sealing member 47 toward the peripheral wall and the second and third sealing members 49 and 51 in opposite directions toward the end walls 15 and 17.

More specifically, the first sealing member 47 comprises a relatively flat and generally rectangular plate which has a length slightly less than the distance between the end walls 15 and 17 and which is disposed in the slot 31 against one side 53 thereof with its outer, slightly rounded edge 55 in engagement with the peripheral wall 19.

Means are provided for biasing the first sealing member 47 radially outwardly into sealing engagement with the peripheral wall 19. While various means can be used, in the disclosed construction, such means is in the form of a leaf spring 57 which bears against the radially inwardly located base 59 of the slot 31 and the inner edge 61 of the sealing member 47.

Means are also provided for retaining the biasing means in proper operating position. While various arrangements can be employed, in the disclosed construction, including the leaf spring 57, such means comprises a pair of ears or tabs 63 which extend radially inwardly of the slot 45 from the ends of the inner lengthwise edge 61 to form spaced shoulders 65 engaged by the ends of the leaf spring 57, thereby preventing leaf spring displacement in a direction axially of the rotor 23.

Engagement of the end edges 67 and 69 of the first sealing member 47 with the cavity end walls 15 and 17 serves generally to limit or guide movement of the first sealing member in directions normal to the axis of rotor rotation. However, other means can be employed, such as a guideway in one of the slot 45 or first sealing member 47 and a key or rib received in the guideway and extending from the other of the slot or first sealing member.

The second and third sealing members 49 and 51 are employed to afford sealing engagement with the respective end walls 15 and 17 of the cavity 21 and are located in coplanar relation to each other within the slot 45. The second sealing member 49 comprises a plate member which is generally rectangular, except for an ear 71 extending from one end edge 73 thereof and which is generally flat except for a key or rib 75 extending lengthwise along one face thereof. The third sealing member 51 comprises a plate member which is generally rectangular except for a notched portion 77 at one end and which is generally flat except for a key or rib 79 extending lengthwise along one face thereof.

The second and third sealing members 49 and 51 have a common thickness which, when added to the thickness of the first sealing member 47, provides a relatively close sliding fit between the first sealing member 47 and each of the second and third sealing members 49 and 51, between the first sealing member 47 and the side 53 of the slot 45, and between the second and third sealing members 49 and 51 and the other side 81 of the slot 45, whereby gas leakage therebetween is substantially prevented, while relative movement between the various members 47, 49, and 51 and between the various members and the slot 45 is afforded.

Means are provided for limiting or guiding movement of the second and third sealing members 49 and 51 to directions parallel to the rotor axis and for locating the respective outer lengthwise edges 83 and 85 of the second and third sealing members 49 and 51 in generally flush relation to the adjacent outer surface of the rotor. While various means and arrangements can be employed, in the disclosed construction, such means includes a guideway 87 extending in the side 81 of the slot 45 in parallel relation to the rotor axis, together with the before mentioned keys 75 and 79 which are received in the guideway.

Means are provided for biasing the second and third sealing members 49 and 51 for sealing engagement of their respective outer end edges 89 and 91 against the respective end walls 15 and 17. While various arrangements can be employed, in the disclosed construction, such means is in the form of a single leaf spring 93 engaged between the respective inner end edges 73 and 95 of the members 49 and 51. If desired, separate springs reacting against a part of the rotor could be employed to separately bias each of the sealing members 49 and 51 toward the respective end walls.

In order to provide space to house the spring 93, the projection of the ear 71 in the axial direction is greater than the depth of the recess in the portion 77 of the third sealing member 51. In order to provide a seal against entry into the space housing the spring 93, the distance of the ear 71 and of the recess from the guideway 87 are substantially identical. Accordingly, the second and third sealing members 49 and 51 respectively include surfaces 97 and 99 which are movably and slidably engaged with one another to prevent gas leakage or flow therebetween. In its broadest form, the last mentioned sealing engagement could be provided by a surface on one of the second and third sealing members and a cooperating edge on the other of the second and third sealing members.

Preferably, means are provided for retaining the spring 93 in proper operating position. While it is generally impossible for the spring 93 to become dislodged from between the second and third sealing members 49 and 51, it is preferred to provide the second sealing member 49 with an ear or tab 101 which extends toward the third sealing member 49 from adjacent the inner end of edge 73 of the second sealing member 49. As a result, the ear and the tab 101 provides shoulders 103 which are enengageable with the spring ends to prevent spring displacement.

In operation, the spring 57 biases the first sealing member 47 for sealing engagement with the peripheral wall 19 while the spring 93 biases the second and third sealing members 49 and 51 for sealing engagement with the respective end walls 15 and 17. As can be readily appreciated, the seal construction or arrangement at each of the apex portions 31 comprises parts which can be easily and economically manufactured and assembled and which provide resilient sealing engagement with the peripheral wall 19 and with the end walls 15 and 17 except for an insignificant area in the corner between the peripheral wall 19 and the end walls 15 and 17.

In addition to the sealing arrangements described immediately above, conventional seals 105 extend from each apex portion 31 to the adjacent apex portion 31 and cooperate with the sealing arrangements described above, to prevent unwanted escape or leakage of gases between the working chambers 33. If desired, an additional ring seal 107 can also be provided for oil control.

Various of the features of the invention are set forth in the following claims.

I claim:

1. A rotary combustion engine comprising a housing having axially spaced end walls and a peripheral wall interconnecting said end walls to form a cavity therebetween, a rotor rotatably received within said cavity and having axially spaced end faces adjacent to said end walls and a plurality of circumferentially spaced apex portions adjacent to said peripheral wall to form between said rotor and said peripheral wall a plurality of working chambers which vary in volume upon relative rotation of said rotor and said housing, one of said apex portions including means defining a slot extending between said end faces and radially inwardly from the outermost apex portion periphery, first, second, and third sealing members located in said slot, means biasing said first sealing member toward said peripheral wall and said second and third sealing members in opposite directions toward said opposing end walls, said second and third sealing members being located in coplanar relation to each other and in engaged parallel relation to said first sealing member, the width of either of said second and third sealing members plus the width of said first sealing member being slightly less than the width of said slot, and cooperating means on said rotor and on each of said second and third sealing members for limiting movement of said second and third members relative to said slot in directions parallel to the rotatable axis of said rotor.

2. A rotary combustion engine comprising a housing having axially spaced end walls and a peripheral wall interconnecting said end walls to form a cavity therebetween, a rotor rotatably received within said cavity and having axially spaced end faces adjacent to said end walls and a plurality of circumferentially spaced apex portions adjacent to said peripheral wall to form between said rotor and said peripheral wall a plurality of working chambers which vary in volume upon relative rotation of said rotor and said housing, one of said apex portions including means defining a slot extending between said end faces and radially inwardly from the outermost apex portion periphery, a first sealing member located in said slot and having a length approximating the axial width of said rotor, means located in said slot and between said rotor and said first sealing member for biasing said first sealing member radially outwardly of said slot into sealing engagement with said preipheral wall, second and third sealing members located in coplanar relation to each other in said slot, cooperating means on said rotor and on each of said second and third sealing members for guiding movement of said second and third sealing members relative to said slot in directions parallel to the rotational axis of said rotor, and a spring located in said slot and between said second and third sealing members for biasing each of said second and third sealing members in opposite directions parallel to the rotational axis of said rotor and into sealing engagement with said end walls.

3. A rotary combustion engine comprising a housing having axially spaced end walls and a peripheral wall interconnecting said end walls to form a cavity therebetween, a rotor rotatably received within said cavity and having axially spaced end faces adjacent to said end walls, a plurality of circumferentially spaced apex portions adjacent to said peripheral wall to form between said rotor and said peripheral wall a plurality of working chambers which vary in volume upon relative rotation of said rotor and said housing, one of said apex portions including means defining a slot extending between said end faces and radially inwardly from the outermost apex portion periphery and including a guidway extending parallel to the rotational axis of said rotor, first, second and third sealing members located in said slot, each of said sealing members including an edge, said second and third sealing members being located in coplanar relation to each other, in engaged parallel relation to said first sealing member, and including means cooperating with said guideway for guiding movement of said second and third members relative to said slot in directions parallel to the rotational axis of said rotor, one of said second and third sealing members having a sealing surface located inwardly of said edge thereof and extending in the direction of movement of said second and third sealing members, the other of said second and third sealing members having a sealing surface located inwardly of said edge thereof, extending in the direction of movement of said second and third sealing members, and engaging said sealing surface on said one of said second and third sealing members, a first spring biasing said edge of said first sealing member toward said peripheral wall, and a second spring biasing said edges of each of said second and third sealing members in opposite directions toward said opposing end walls.

4. A rotary combustion engine comprising a housing having axially spaced end walls and a peripheral wall interconnecting said end walls to form a cavity therebetween, a rotor rotatably received within said cavity and having axially spaced end faces adjacent to said end walls and a plurality of circumferentially spaced apex portions adjacent to said peripheral wall to form between said rotor and said peripheral wall a plurality of working chambers which vary in volume upon relative rotation of said rotor and said housing, one of said apex portions inclusing means defining a slot extending between said end faces and radially inwardly from the outermost apex portion periphery, first, second, and third sealing members located in said slot, means biasing said first sealing member toward said peripheral wall and said second and third sealing members in opposite directions toward said opposing end walls, said second and third sealing members being located in coplanar relation to each other and in engaged parallel relation to said first sealing member, and cooperating means on said rotor and on each of said second and third sealing members for limiting movement of said second and third members relative to said slot in directions parallel to the rotatable axis of said rotor.

References Cited

UNITED STATES PATENTS

| | | |
|---|---|---|
| 1,566,075 | 12/1925 | Cotton. |
| 2,356,461 | 8/1944 | Lepis. |
| 2,772,201 | 11/1955 | Muse. |
| 2,988,065 | 6/1961 | Wankel et al. _____ 123—8 |
| 3,127,095 | 3/1964 | Froede. |
| 3,268,157 | 8/1966 | Frenzel _____ 230—145 |

RALPH D. BLAKESLEE, *Primary Examiner.*

MARK M. NEWMAN, CARLTON R. CROYLE,
*Examiners.*

F. T. SADLER, *Assistant Examiner.*